United States Patent [19]

Califano et al.

[11] Patent Number: 4,600,166
[45] Date of Patent: Jul. 15, 1986

[54] MISSILE HAVING REDUCED MASS GUIDANCE SYSTEM

[75] Inventors: Herbert T. Califano, Bloomingdale; James M. Schuchardt, Ramsey; Gotthard K. Spindler, Hasbrook Heights, all of N.J.

[73] Assignee: Allied Corporation, Morris Township, N.J.

[21] Appl. No.: 619,657

[22] Filed: Jun. 11, 1984

[51] Int. Cl.⁴ .................. F41G 7/00; F42B 13/10
[52] U.S. Cl. ........................ 244/3.16; 102/476
[58] Field of Search ............... 244/3.1, 3.15, 3.16, 244/3.19, 3.2; 102/476; 74/5 R, 5.22, 5.43, 5.46, 5.6 A, 5.6 B, 5.7

[56] References Cited

U.S. PATENT DOCUMENTS

| | | | |
|---|---|---|---|
| 2,872,821 | 2/1959 | Derossi | 74/5.1 |
| 3,187,588 | 6/1965 | Parker | 74/5.12 |
| 3,528,300 | 9/1970 | Paine | 74/5.7 |
| 3,596,523 | 8/1971 | Clark | 74/5.6 |
| 3,898,668 | 8/1975 | Evans et al. | 343/759 |
| 3,915,019 | 10/1975 | Zoltan | 74/5.6 A |
| 3,920,200 | 11/1975 | Evans et al. | 244/3.16 |
| 3,924,475 | 12/1975 | Stiles | 74/5.6 A |
| 4,009,848 | 3/1977 | Albert et al. | 244/3.16 |
| 4,030,807 | 6/1977 | Briney | 244/3.16 |
| 4,036,453 | 7/1977 | Evans et al. | 244/3.16 |
| 4,155,521 | 5/1979 | Evans et al. | 244/3.16 |
| 4,291,849 | 9/1981 | Rodgers et al. | 244/3.22 |
| 4,309,005 | 1/1982 | McLean | 244/3.16 |
| 4,339,097 | 7/1982 | Kordulla et al. | 244/3.16 |

FOREIGN PATENT DOCUMENTS 53-21375  2/1978 Japan .
54-156978 12/1979 Japan .

*Primary Examiner*—Charles T. Jordan
*Attorney, Agent, or Firm*—Stan Protigal; Howard Massung

[57] ABSTRACT

A guided projectile (11) is provided with a gyroscope (29) having a spherical rotor (41). The rotor (41) is supported at its outer spherical surface by a stator (42) using fluid bearing techniques. The stator (42) is fixed to the projectile's housing (38) so that the gyroscope (29) is operated in a strapdown mode.

The structure of the gyroscope (29) and particularly the stator (42) places very little material along its center axis of the projectile (11). This is particularly useful where the projectile's warhead (17) functions by squirting a stream (25) of metal through a target's armor, and any material in the way of the stream (25) would tend to diminish the lethality of the projectile (11). The spherical configuration of the rotor (41) and the use of the stator (42) as a support bearing also provides a method of supporting the rotor (41) during conditions of high acceleration which are experienced in cannon launch of the projectile (11). Other advantages include light weight, low cost and high reliability.

19 Claims, 3 Drawing Figures

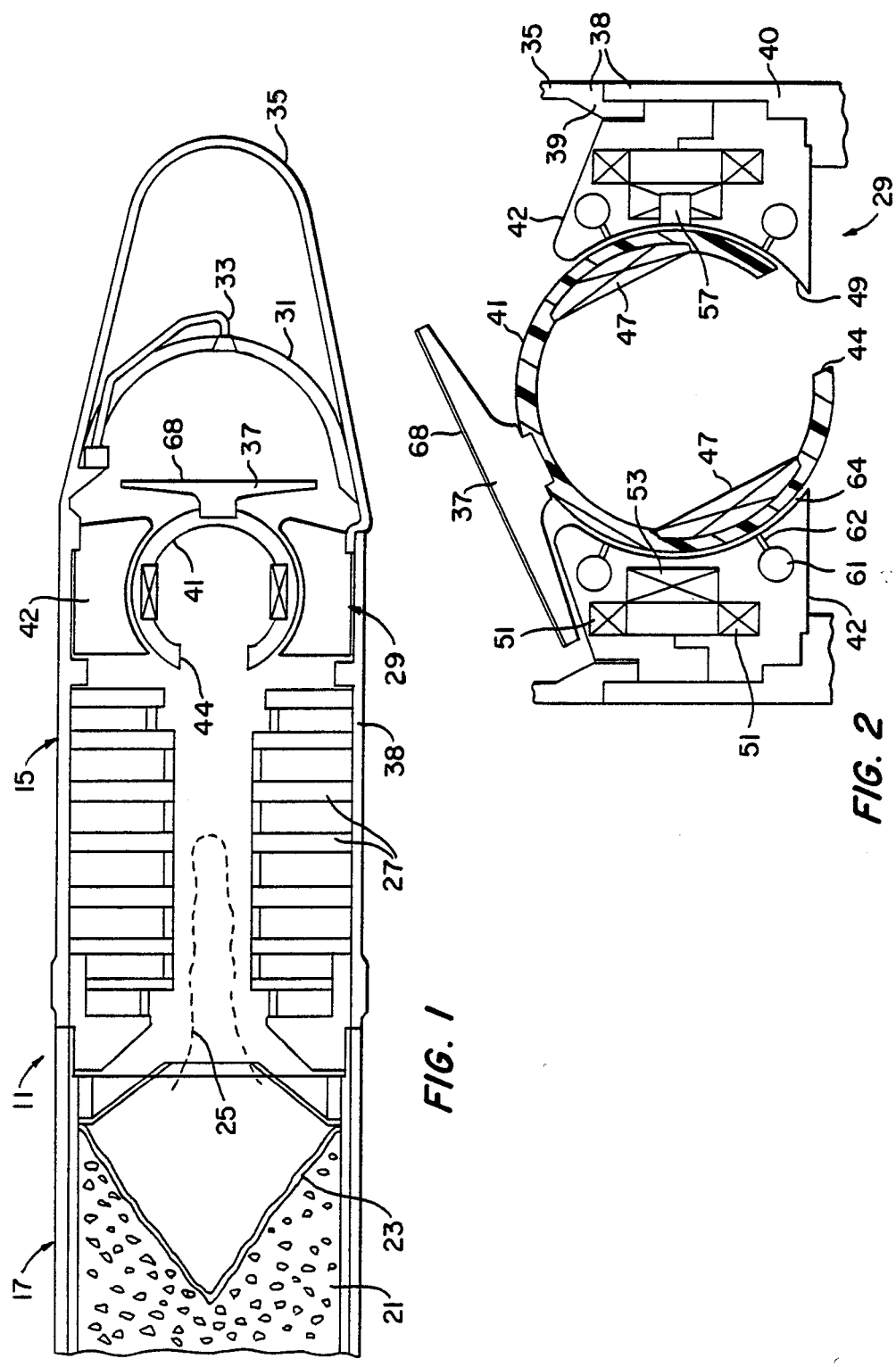

MISSILE HAVING REDUCED MASS GUIDANCE SYSTEM

BACKGROUND OF THE INVENTION

This invention relates to guided missiles. More particularly, this invention relates to guided projectiles in which a guidance system provides a pathway for a warhead charge when the projectile has reached its target.

The present invention was developed for use in a guided armor-piercing artillery round. In a typical application, a strapdown gyroscope is mounted in the nose of a projectile round. The artillery round contains a warhead which includes a shaped charge which is separated from the gyroscope by electronic circuit boards. Upon detonation, the shaped charge causes material such as copper to be plastically deformed and directed past the circuit boards and gyroscope in order that the material can pierce the armor plating of a target which the projectile has struck. The circuit boards can usually accommodate the material by providing appropriate openings within the center of each circuit board. It is also possible to make circuit boards sufficiently thin that they present effectively no impediment to the flow of plastically deformed metal. The gyroscope, on the other hand, is typically mounted along the center line of the projectile's center axis. For this reason, a plastically deformed stream propelled by the shaped charge must penetrate the gyroscope. This diminishes the material's ability to penetrate armor and consequently has a detrimental effect on the shell's lethality.

Such guided shells are typically launched as 155 mm howitzer rounds. These rounds experience approximately 9,000 g's upon launch with "Zone 7" charges and up to 15,000 g's at launch with "Zone 8 super charges". Clearly, all components required to be used after launch, such as the guidance system, must be hardened to withstand the stresses imposed by the launch environment.

The gyroscope is the most difficult seeker item to harden. The gyroscope is a precision inertial measurement instrument and cannot tolerate the inducement of large drifts or biases by the cannon launch environment. A primary design problem was that the extreme launch load would damage the gimbal bearing, causing unacceptable gyroscope performance. A prior art technique was developed which added a load carrying flange to a conventional bearing design. At launch, the load transfer bearing deflected under load until a gap between the flanges closed. With the gap closed, the load carrying area is significantly increased, preventing any further deflection. With the majority of the load carried in the flange area, the bearings are protected and gyroscope performance does not change after experiencing the cannon launch environment.

These prior art load transfer bearings also had to be enhanced by the presence of a structural load carrying sleeve called a "gotcha" mechanism. The gotcha transfers the load created by the gyroscope rotor to the primary structure and prevents the load from being carried by the gimbals and bearings. The prior art gyroscope rotor only weighs 0.220 kg, but under a 9000 g launch its weight is equivalent to 1980 kg. Thus, the level of protection afforded by the gotcha to prevent this level from reaching the bearing was crucial. The gotcha assembly also formed an obstruction to the movement of the plastically deformed material which was intended to penetrate the armor of the target.

Accordingly, it is desirable to provide a gyroscope assembly which presents a reduced obstruction to material passing through its center. It is desired to provide a gyroscope assembly which does not require a separate gripping mechanism to protect the gyroscope during high-g launch conditions. It is further desired that the gyroscope be able to operate efficiently and accurately as soon as possible after experiencing a high-g launch in order that target acquisition and projectile guidance functions can be achieved as early as possible. It is also important to provide a gyroscope which can be used for strapdown target acquisition, which is inexpensive to produce. In furtherance of these goals, it is desirable to provide a gyroscope in which plastic components be substituted for metal components to the extent that ferromagnetic properties of the components are not required.

SUMMARY OF THE INVENTION

In accordance with the present invention, a gyroscope rotor has a spherical shape and is contained within a conforming stator assembly. A fluid such as gas is used to support the rotor within the stator assembly. The stator assembly is capable of providing non-destructive static support for the rotor under high-g launch conditions. The rotor may be constructed primarily of plastic material or formed metal and may be made hollow. Support for the rotor is achieved at the outer perimeter of the rotor and results in compressive loads during launch.

In one embodiment, the stator assembly is fixed to a projectile housing and the gyroscope is used as a two-degree of freedom strapdown gyroscope. A reflective disc is mounted to the front end of the rotor and is caused to rotate with the rotor as an integral part of the optical system in order to provide guidance signals, using energy from a designated target reflected by the gyro/gimbal to the seeker detector. Advantages of this configuration include the provision of very little obstruction to warhead material passing through the gyroscope, integral provision of high-g support for the gyroscope rotor, enhanced reliability of the gyroscope during and after launch and low cost.

BRIEF DESCRIPTION OF THE DRAWINGS

FIG. 1 is a cross-sectional side view of the front of a preferred embodiment of the inventive anti-armor projectile and gyroscope;

FIG. 2 is a side cross-sectional view, showing details of the gyroscope in FIG. 1.

DETAILED DESCRIPTION OF THE PREFERRED EMBODIMENT

Figure 3:
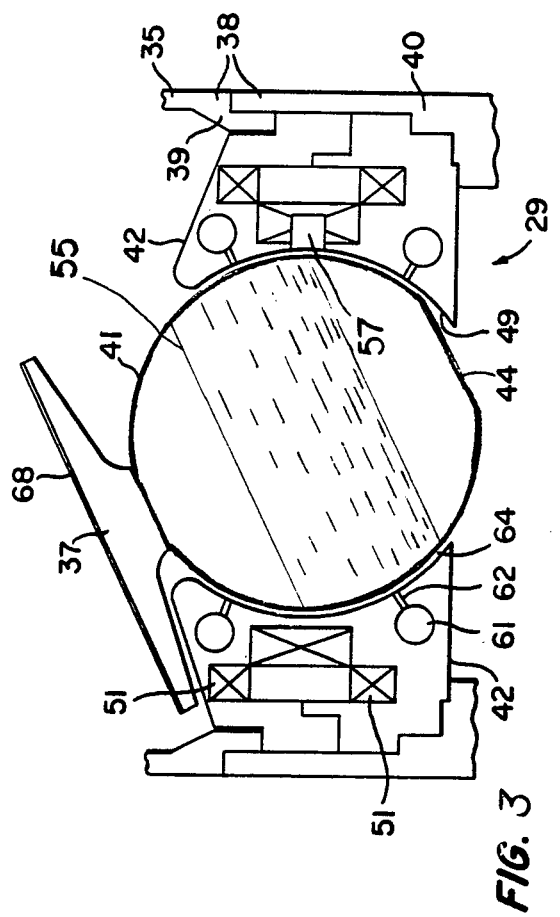
FIG. 3 is a view similar to FIG. 2, showing an optical band used on the exterior of the gyroscope rotor.

FIG. 1 shows the front end of a guided anti-armor projectile 11 using the invention. The projectile 11 includes a guidance section 15 mounted to the front of a warhead section 17. The warhead section 17 is mounted to the front of a control section (not shown). In order to enhance its armor piercing capabilities, the warhead section 17 includes a shaped charge 21. A layer 23 of copper or other metal is provided immediately adjacent the shaped charge 21, so that when the shaped charge 21 is detonated, the copper in the layer is "squirted" forward in a state of superplastic deformation. The "squirted" copper is projected forward as a metal jet or stream, indicated by dashing lines 25. This efficiently converts the chemical energy in the charge into other forms of energy including energy of momentum. The primary effects of the projectile against its target are accomplished by the stream 25 of the deformed copper, as it impinges upon the surface of the target to penetrate the target's armor. At that time, the guidance section 15 no longer has any practical value and any components within the guidance section 15 that are in the way of the stream 25 must first be penetrated before the stream 25 penetrates the target. Penetrating the material forward of the warhead reduces the penetrating capability of the forming metal stream 25 by removing energy and displacing the material of the stream 25.

The guidance section 15 includes a series of spaced printed circuit cards 27, in front of which is located a gyroscope 29. In front of the gyroscope 29 is a lens 31, a transducer 33, and a radome 35. Mounted to the gyroscope 29 is a reflecting disc 37, located behind the lens 31.

When the shaped charge 21 is detonated immediately upon signals from the radome's impact or impending impact, the stream of copper 25 will be approximately at the location of the lens 31 when the lens 31 is reaching the target. Therefore, the gyroscope 29 cannot be expected to be destroyed by impact with the target before the stream of copper 25 is "squirted" through the gyroscope 29 and is in the way of the forming stream 25.

Referring to FIG. 2, the gyroscope 29 is mounted to the projectile's housing 38, using support flanges 39, 40 which extend as projections from the housing 38 (or from the radome portion 35 of the housing). The gyroscope 29 includes a spherical rotor 41 and a stator 42, with the stator 42 being directly supported by the projectile housing 38 between the support flanges 39, 40. The rotor 41, as previously indicated, has a spherical outer profile. This spherical outer profile extends about the rotor 41 where it interfaces with the stator 4. A rear part of the rotor 41 preferably has an opening 44 which, when the rotor is aligned in the manner shown in FIG. 1, is centered along the longitudinal axis of the projectile 11. The reflecting disc 37 is mounted to the forward part of the rotor 41, so that the reflecting disc 37 is on the opposite side of the rotor 41 from the opening 44. The rotor 41 is preferably made of a material which is lightweight and offers little resistance to the metal stream 25 passing through. In the preferred embodiment, the rotor 41 is made of polyphenylene sulfide (PPS), with a 40% carbon fill. This material has a coefficient of expansion which is similar to that of a permanent magnet 47 which is inserted into the sides of the rotor 41 as part of the rotor 41. The rotor 41 may also be metallic with the preferred material being titanium, preferrably Ti6 A14 V. This material also matches the thermal coefficient of expansion of the permanent magnet 47. Regardless of the material choice, the design permits the rotor 41 to be thin walled and therefore offer little resistance to the warhead stream 25.

The stator 42 partially surrounds the rotor 41 so that under most operating conditions, the opening 44 clears the stator 42. When the rotor 41 is in a non-operating state, the opening 44 may overlap the stator 42, as is the case in FIG. 2, which shows an overlapping section 49. The rotor 41 is driven by rotor winding coils 51 located in the stator 42, and which cause the magnet 47 in the rotor to react. A torquer coil 53, also in the stator 42 is used to provide alignment force to the rotor 41 by reacting with the magnet 47. When the magnet is misaligned, such as shown in FIG. 2, EMF applied across the torquer coil 53 creates a vector resulting force in the magnetic field created by the torquer coil 53, causing a change in current flowing through the torquer coil 53. When the rotor 41 is caused to rotate by the motor winder coils 51, the rotor 41 functions as an inertial gyroscope rotor.

An optical band 55 is imprinted on the surface of the rotor 41 about its lateral circumference. The optical band has alternating light and dark areas whose ratio varies in proportion to the distance from the front of the rotor 41 (the front being that part closest to the plate 37). Thus, the ratio varies in accordance with the axial position along the rotor 41. A pair of orthogonally placed optical sensors, such as sensor 57, use the optical band to detect the angular position of the rotor 41 with respect to the longitudinal axis of the projectile 11. The torquer coils 53 are utilized to change the angular position of the rotor 41 as desired for the purposes of positioning the reflecting disc 37, with current required to maintain alignment of the rotor 41 being proportional to angular rate of the projectile for any given rotor speed. This pickoff and torquer system may also be used to search for targets and to track targets that are substantially off the projectile's center axis.

The rotor 41 is suspended within the stator 42 by fluid such as compressed gas. The fluid is provided through a series of manifolds 61 extending about the circumference of the stator 42 and a plurality of gas ducts 62 that channel fluid from the manifolds 61 to a space 64 between the stator 42 and rotor 41. The ducts 62 are evenly spaced around the space 64. The ducts 62 preferably extend radially from the curved surface of the stator 42 at the space 64, although it is also possible to use the fluid to provide a motorizing function. Such an arrangement is shown, for example, in U.S. Pat. No. 3,738,179, assigned to the assignee of the present invention. In either case, this arrangement of providing gas to the manifolds 61 and ducts 62 creates a low-friction bearing surface between the stator 42 and rotor 41 at the space 64. This bearing surface at the space 64 has the dual function of providing rotational bearing support and providing gimbal bearing support.

When the projectile 11 is launched, the projectile 11 and its integral components, including the gyroscope 29, experience high-g loads. Typically the projectile experiences accelerations of 9,000 g's, although it is anticipated that the projectile may be launched at acceleration rates in excess of 15,000 g's. It is important that the gyroscope 29 function properly after experiencing such shock loads. Under launch conditions, the fluid (gas) provided through the manifolds 61 and ducts 62 would be insufficient to support the rotor 41. At that time, the rotor 41 comes to rests upon the stator 42. Because of the spherical shape of the rotor 41, pressure upon the rotor 41 under those conditions is spread over a large area and does not create any significant points of concentration of stress. This enables the combined rotor and gimbal bearing to be self-supporting under the high-g conditions. The reflecting disc 37 is reasonably light in weight, but it is expected that the disc 37 will be leaning to one side. For this reason, the stator 42 is appropriately shaped so as to accommodate the disc 37. This also provides a second function of protecting the disc 37 when the rotor 41 is initially started and the disc 37 is prone to slamming against the rotor 42. Significantly, most launch stresses within the rotor are compressive.

After launch, gas pressure applied to the manifold 61 separates the rotor 41 from the stator 42 and the motor winding coils 51 urge the rotor 41 to begin to rotate. The torquer coil 53 applies current to right the rotor 41 with respect to the vehicle's longitudinal axis, in order to provide guidance for controlling the projectile.

Upon launch, the projectile 11 is initially unguided, following a trajectory path. The projectile 11 may use a slipping obturator (not shown) which allows the projectile 11 to be relatively unaffected by rifling in the gun used for launching the projectile. After launch, the projectile 11 according to the preferred embodiment of the invention is inertially guided in accordance with a predetermined program relating to a desired glide path. At this time, the gyroscope 29 provides rate information which is used in a conventional manner to guide the projectile with the aid of steering fins (not shown) or canards (not shown).

After the inertial guidance stage, the torquer coil 53 induces the rotor 41 to be angularly displaced from a vertical axis parallel to the longitudinal axis of the projectile 11. This angular displacement of the rotor 41 is preferably accomplished in a spiral raster or rosette pattern so that a reflecting surface 68 on the front of the reflecting disc 37 is effectively pivoted in a desired direction. While the rotor 41 and consequently the reflecting disc 37 are also rotating at a high speed, this high speed rotation does not affect the normal axis of the reflecting surface 68. For this reason, the reflecting disc 37 may be treated as only being moved in accordance with the angular displacement of the rotational axis of the rotor 41, as long as that rotational axis passes through the center of the reflecting disc 37.

The spherical shape of the rotor 41, and the support of the rotor 41 by fluid between the rotor 41 and the stator 42 give the rotor 41 and consequently the reflecting disc 37, considerably more freedom of movement. It is estimated this configuration will approximately double the angular range of the reflecting disc 37 over that of the prior art.

Referring to FIG. 1, the reflecting surface 68 cooperates with the lens 31 and the transducer 33 in order to reflect energy from a target. Since the axis of the rotor 41 is being displaced in a pre-determined or programmed fashion, this causes the reflecting disc 37 to effectively displace in the same programmed fashion. This forms a search pattern which the disc 37 uses to search for a target. In the preferred embodiment, the reflected energy is provided as microwave energy from the transducer 33, which energy is reflected from the disc 37 to the target, back to the disc 37 and to the transducer 33. It is also possible to provide other arrangements in which an external designator, such as a laser designator, is used to provide energy which is reflected from the target. Other arrangements include infrared, imaging infrared, radar, and accoustic sensors In these cases, the configuration of the lens 31 and the transducer 33 would be changed, although the reflecting disc 37 would remain substantially the same. When the reflected energy from the target has been detected, the target is then acquired by the projectile's guidance system which guides the projectile 11 to the designated target. It is also possible to provide a dual mode of target designation. This is advantageous where laser designators are used to designated targets because of the difficulty in using the laser designation techniques.

The above description of the preferred embodiment is directed to a strapdown version of the inventive gyroscope used in association with a cannon-launched projectile. The simple and low cost design of the inventive gyroscope permits it to be used with other (guided) missiles, such as rocket propelled guided missiles, as well as with other guidance and pointing systems. It is also possible to gimbal the gyroscope's stator 42, in which case, the gyroscope would not be a strapdown gyroscope. While plastic has been indicated as a preferred material for the rotor 41, it is possible to use other materials such as metal or ceramic for the rotor 41. Likewise, it is possible to produce the rotor 41 with a variety of configurations along its rotational axis. Thus, in appropriate instances, the reflective plate 37 and the opening 44 could be eliminated or replaced with other components. As previously indicated, it is possible to use the fluid provided for anti-friction purposes in order to induce rotation of the rotor 41. If this system is used, it may be possible to eliminate the motor winding coils 51.

Since these and other modifications of the inventive gyroscope are expected to be made, the invention should be read only as limited by the claims.

What is claimed is:

1. Guided missile having a warhead with a shaped charge which expels energy in a forward direction, a guidance system including a gyroscope located forward of the shaped charge, and the gyroscope having a rotor which has an axis extending from a front end to an aft end of the rotor, a stator which remains stationary with respect to the rotor, means for causing the rotor to rotate about said axis and means to determine the angular position of said axis, characterized by:
   (a) the rotor having an outer surface which has a shape of a sphere section and the rotor being substantially hollow; and
   (b) the stator having an inner surface which has a shape of a sphere section and juxtaposed with said outer surface.

2. Guided missile, as described in claim 1, further characterized by:
   means to provide fluid between the outer spherical surface of the rotor and that surface of the stator which is juxtaposed to the outer surface of the rotor.

3. Guided missile as described in claim 1, further characterized by:
   (a) an optical band on the rotor; and
   (b) means to sense the position of the optical band with respect to the stator, the sensed position of the optical band indicating an angular position of the rotor with respect to the stator.

4. Guided missile as described in claim 3, further characterized by:
   the optical band having alternating light and dark areas where the ratio of light to dark areas varies in proportion to the axial position of the optical band as sensed by the means to sense.

5. Guided missile as described in claim 4, further characterized by:
   the means to sense including a pair of sensors which are positioned on the stator substantially orthogonally to each other with respect to a longitudinal axis of the gyroscope.

6. Guided missile as described in claim 1, further characterized by:

the stator extending around the rotor sufficiently to support the rotor when the gyroscope is exposed to large amounts of acceleration, thereby avoiding the requirement for additional support means to support the rotor under such conditions.

7. Guided missile as described in claim 1, further characterized by:

a reflecting plate mounted to the front end of the rotor, the reflecting plate having a reflecting surface which is perpendicular to the rotor's axis, so that the rotor can be used to search for a target from which a concentration of energy emanates.

8. Guided missile as described in claim 7, further characterized by:

means for generating signals to be reflected from the target as said concentration of energy, thereby formed echo signals; and means, fixed with respect to the stator, for receiving said echo signals, after said echo signals have been further reflected from said reflecting plate.

9. Guided missile as described in claim 1, further characterized by:

means to provide fluid between the spherical surface of the stator and the rotor, the fluid providing bearing support for the rotor.

10. Guided missile as described in claim 9, further characterized by:

the fluid being a gas.

11. Guided artillery projectile having a warhead with a shaped charge which expels energy in a forward direction, a guidance system including a gyroscope located forward of the shaped charge, and the gyroscope having a rotor which has an axis extending from a front end to an aft end of the rotor, a stator which remains stationary with respect to the rotor, means for causing the rotor to rotate about said axis and means to determine the angular position of said axis, characterized by:

(a) the rotor having an outer surface which has a shape of a sphere section and the rotor being substantially hollow; and (b) the stator having an inner surface which has a shape of a sphere section and juxtaposed with said outer surface.

12. Guided artillery projectile, as described in claim 11, further characterized by:

means to provide fluid between the outer spherical surface of the rotor and that surface of the stator which is juxtaposed to the outer surface of the rotor.

13. Guided artillery projectile as described in claim 11, further characterized by:

(a) an optical band on the rotor; and (b) means to sense the position of the optical band with respect to the stator, the sensed position of the optical band indicating an angular position of the rotor with respect to the stator.

14. Guided artillery projectile as described in claim 13, further characterized by:

the optical band having alternating light and dark areas where the ratio of light to dark areas varies in proportion to the axial position of the optical band as sensed by the means to sense.

15. Guided artillery projectile as described in claim 14, further characterized by:

the means to sense including a pair of sensors which are positioned on the stator substantially orthogonally to each other with respect to a longitudinal axis of the gyroscope.

16. Guided artillery projectile as described in claim 11, further characterized by:

the stator extending around the rotor sufficiently to support the rotor when the gyroscope is exposed to large amounts of acceleration, thereby avoiding the requirement for additional support means to support the rotor under such conditions.

17. Guided artillery projectile as described in claim 11, further characterized by:

a reflecting plate mounted to the front end of the rotor, the reflecting plate having a reflecting surface which is perpendicular to the rotor's axis, so that the rotor can be used to search for a target from which a concentration of energy emanates.

18. Guided artillery projectile as described in claim 11, further characterized by:

means to provide fluid between the spherical surface of the stator and the rotor, the fluid providing bearing support for the rotor.

19. Guided artillery projectile as described in claim 18, further characterized by:

the fluid being a gas.

* * * * *